T. L. CORBITT.
THERMAL CIRCUIT CLOSER.
APPLICATION FILED JUNE 22, 1917.

1,312,835.

Patented Aug. 12, 1919.
2 SHEETS—SHEET 1.

Witnesses
Philip Lovell
Francis L. Browell

Inventor
T. L. Corbitt
By D. Swift & Co.
Attorneys

T. L. CORBITT.
THERMAL CIRCUIT CLOSER.
APPLICATION FILED JUNE 22, 1917.

1,312,835.

Patented Aug. 12, 1919.
2 SHEETS—SHEET 2.

Inventor
T. L. Corbitt
By D. Swift & Co.
Attorneys

Witnesses

UNITED STATES PATENT OFFICE.

THOMAS L. CORBITT, OF JOHNSTON CITY, ILLINOIS.

THERMAL CIRCUIT-CLOSER.

1,312,835.   Specification of Letters Patent.   Patented Aug. 12, 1919.

Application filed June 22, 1917. Serial No. 176,351.

*To all whom it may concern:*

Be it known that I, THOMAS L. CORBITT, a citizen of the United States, residing at Johnston City, in the county of Williamson, State of Illinois, have invented a new and useful Thermal Circuit-Closer; and I do hereby declare the following to be a full, clear, and exact description of the invention, such as will enable others skilled in the art to which it appertains to make and use the same.

This invention relates to an improved thermally controlled electrical heating means, particularly adapted for use in connection with incubators and the like, and one of the objects of the invention is to provide a simple, efficient and practical device of this kind, which may be manufactured at a small cost and sold at a reasonable profit, and capable of an easy application for incubators.

A further object of the invention is the provision of a device of this kind having electric heating bulbs for the interior of the incubator, in combination with a thermostatic device, whereby, upon expansion and contraction incident to the increase and decrease of the heat in the incubator chamber, means (which is electrically connected to the heating bulbs) is operated for opening and closing an electric circuit for controlling the bulbs.

A further object of the invention is to provide means whereby as the heat in the incubator chamber decreases to a dangerous point, an alarm is sounded.

In practical fields, the details of construction may necessitate alterations falling within the scope of what is claimed.

The invention comprises further features and combinations of parts, as hereinafter set forth, shown in the drawings and claimed.

In the drawings:—

Figure 1:
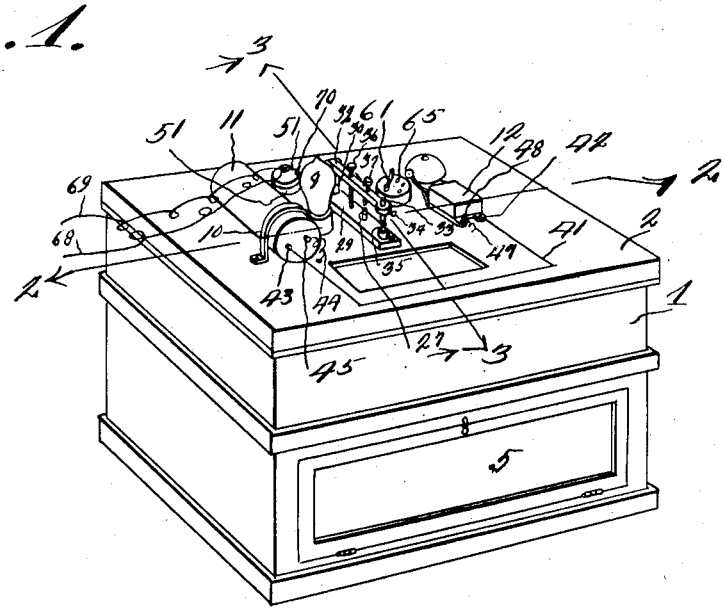
Figure 1 is a view in perspective of an incubator showing the improved thermally controlled electrical heating means applied thereto.
Figure 2:
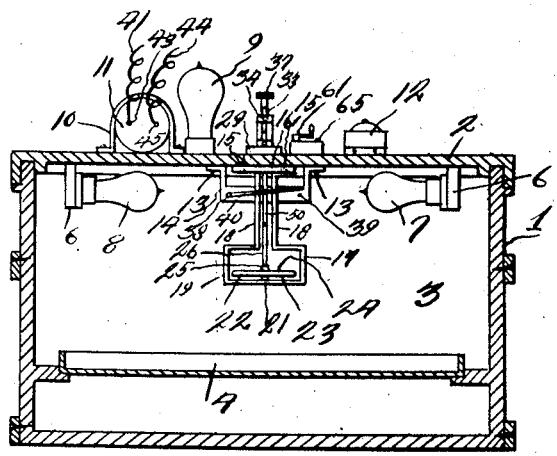
Fig. 2 is a sectional view on line 2—2 of Fig. 1.
Figure 3:
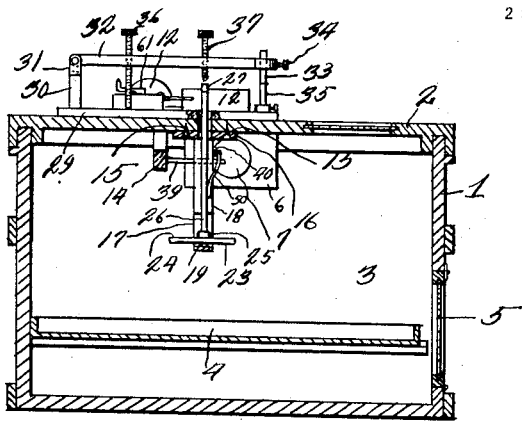
Fig. 3 is a sectional view on line 3—3 of Fig. 1.
Figure 4:
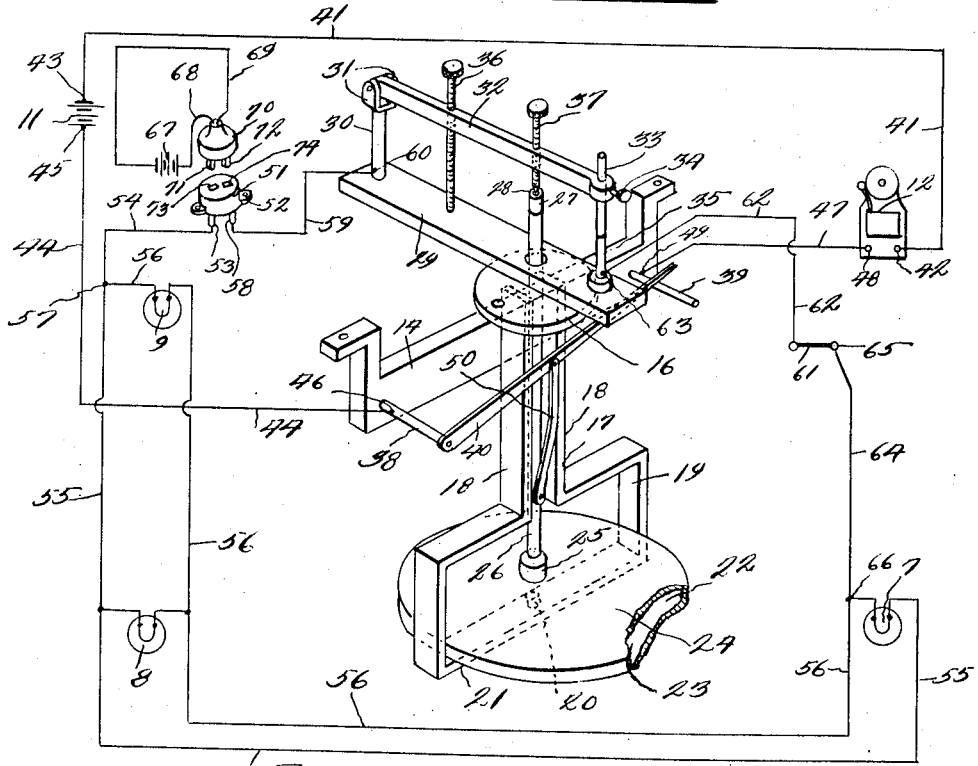
Fig. 4 is an enlarged detail perspective view of the thermally controlled circuit making and breaking device, showing the diagrammatic arrangement of a wiring for the electric heating bulbs for the incubator chamber.

Referring more especially to the drawings, 1 designates a casing of an incubator, which may be any conventional or suitable construction, provided with a top 2 and an incubator chamber 3, which receives the tray 4. A suitable door 5 is provided for one side of the casing of the incubator, whereby the tray may be inserted or removed. The under surface of the top is provided with suitable projections 6 carrying electric heating bulbs 7 and 8. On the outer or upper face of the top an electric bulb 9 is arranged. By means of a suitable arched strap 10, a suitable dry battery 11 is secured to the upper face of the top. Also carried by the upper face of the top is an alarm bell 12. Secured at 13 to the underface of the top is an arch or U-shaped bracket or plate 14. By means of the screws 15, a circular plate 16 is secured to the underface of the top, and depending downwardly from the plate 16 is a T-shaped frame 17 constructed from a single strip of metal, which is bent to form the arms 18 and the base loop 19. Connected at 20 to the transverse part 21 of the loop 19 is a thermal device 22 having opposing diaphragms 23 and 24, which are so sensitive to the increase and decrease of the heat in the incubator chamber as to expand and contract. The diaphragm 24 has a central projection 25, on which a vertically movable rod 26 is supported, which passes upwardly through an opening of the circular plate 16 and also through the top 2 of the incubator and its upper end has an insulating tip 27 provided with a small tapering or conical recess 28. The arch member or plate 14 is constructed of any suitable material, preferably insulation, and mounted on the top 2 is a plate of insulation 29. Rising from one end of the plate 29 is a post or standard 30 having forks 31 at its upper end. Pivoted between the forks 31 is a lever 32. A vertical terminal contact rod 33 is secured by a set screw 34 in the free end of the lever 32, and which contact rod 33 may be adjusted and is designed to contact with the terminal contact rod 35 which projects upwardly from the plate 29 at its end portion opposite the end portion having the post 30. A suitable screw 36 is threaded through the lever 32, whereby its lower end may contact with the plate 29 to limit the downward movement of the lever 32, so that the contacting rods 33 and 35 may just contact without supporting the entire weight of the lever 32. A second screw 37 is threaded through the lever 32, and may be adjusted so that at a certain predetermined moment or when the rod 26 raises the lower tapered end of said screw 37 will enter the conical socket or recess 28 of the insulating tip 27 of said rod 26, whereby the lever 32 may be tilted upwardly to separate the terminal contacting rods 33 and 35. Projecting laterally from the plate or member 14 are the terminals 38 and 39, and pivoted on the terminal 38 is a lever 40, whereby its free end may contact with the terminal 39. A suitable lead or wire 41 extends from the binding screw 42 of the bell 12 to the binding post or terminal 43 of the battery 11. A wire or lead 44 extends from the binding screw or terminal 45 of said battery 11, and through the top of the incubator, and is connected at 46 to the terminal 38. A wire 47 extends from the binding terminal 48 of the bell 12 and is connected at 49 to the terminal contact 39. The lever 40 is connected to the rod 26 by means of the link 50. It will be observed that when the heat in the incubator chamber decreases, the diaphragm 24 of said thermal device will contract, and incidentally the rod 26 will lower, moving the lever 40 downwardly on its pivot, causing the free end of said lever 40 to engage the terminal contact 39, thereby closing the bell circuit, indicating or sounding an alarm that the heat in the incubator chamber has become decreased. A double socketed member 51 is secured at 52 to the top of the incubator, and leading from the terminal 53 of said member 51 is a wire or lead 54. The electric bulbs 7, 8 and 9 are connected in parallel by means of the leads or wires 55 and 56 and the wire or lead 54 forms a junction 57 with said wires 55 and 56. The second terminal 58 of said member 51 has a wire or lead 59 connected thereto and is in turn connected at 60 to the post 30. A suitable switch 61 is carried by the top of the incubator, and extending from the pivot of the switch lever 61 is a lead or wire 62, which is in turn connected at 63 to the terminal contacting rod 35. A wire 64 extends from the terminal 65 of the switch, and in turn forms a junction at 66 with the wires or leads 55 and 56. A suitable battery 67 is provided to represent a suitable source of electrical energy from a city plant or the like, and the wires 68 and 69 thereof are connected to the plug member 70, the terminal members 71 and 72 of which are designed to enter the sockets 73 and 74 respectively, whereby the local circuit of the electric heating means of the incubator may be connected to the circuit of the electrical source of energy. Therefore, when the switch 61 is closed, current will pass from the battery 67 through the terminals 71 and 53 of the members 70 and 51 over the wire 54, thus lighting the bulbs 7, 8 and 9 in parallel, and by means of the bulbs 7 and 8, requisite heat may be generated in the incubator chamber, while the bulb 9 (which is on the exterior of the top of the incubator) will disclose the fact to an observer that heat is under the course of generation in said chamber. The current, after lighting the bulbs 7, 8 and 9 in parallel (that is when the circuit is closed, as hereinafter follows) passes over the wire 64, the switch 61 to the terminal contacting rod 35 by way of the wire 62, over the contacting rod 33 (which contacts with the terminal rod 35 before the bell circuit is closed, which sounds the alarm) and then along the lever 32 to the post 30. The current leaves the post 30 by way of the wire 59, through the terminals 58 and 72 of the members 51 and 70 back to the electric source of energy 67, by way of the wire or lead 69. When the heat in the incubator chamber has increased sufficiently, the diaphragm 24 will expand, lift the rod 26, which in turn will lift the lever 32, thereby breaking the circuit of the electric bulbs. Then, as the heat decreases, naturally the diaphragm 24 will contact, hence, the bell circuit will be closed, sounding the alarm. This cycle of operation consecutively repeats itself, as long as the switch 61 is closed.

The invention having been set forth, what is claimed as new and useful is:—

A circuit closer comprising an insulating plate provided with a terminal post at one of its ends and a stationary contact terminal at its other end, a movable lever pivoted to the terminal post and carrying a contact adapted to make and break a circuit with said stationary contact to control said circuit, a frame supporting a thermostat below the base of the circuit closer, said thermostat having one of its sides secured to the frame and a vertically disposed member attached to the other side of the thermostat, the upper end of the vertical member being adapted to protrude through an aperture in the plate and contact with the end of an adjusting screw in the lever so as to make and break the circuit as the thermostat contracts and expands and an adjusting screw carried by the lever whereby the downward movement of the same is limited and allowing a fine adjustment and timing of the making and breaking of the circuit.

In testimony whereof I have signed my name to this specification in the presence of two subscribing witnesses.

THOMAS L. CORBITT.

Witnesses:
  LOGAN FELTS,
  HUGH BURGESS.